H. SWIFT.
DEVICE FOR DRILLING SQUARE HOLES.
APPLICATION FILED MAY 19, 1920.
1,408,042.  Patented Feb. 28, 1922.
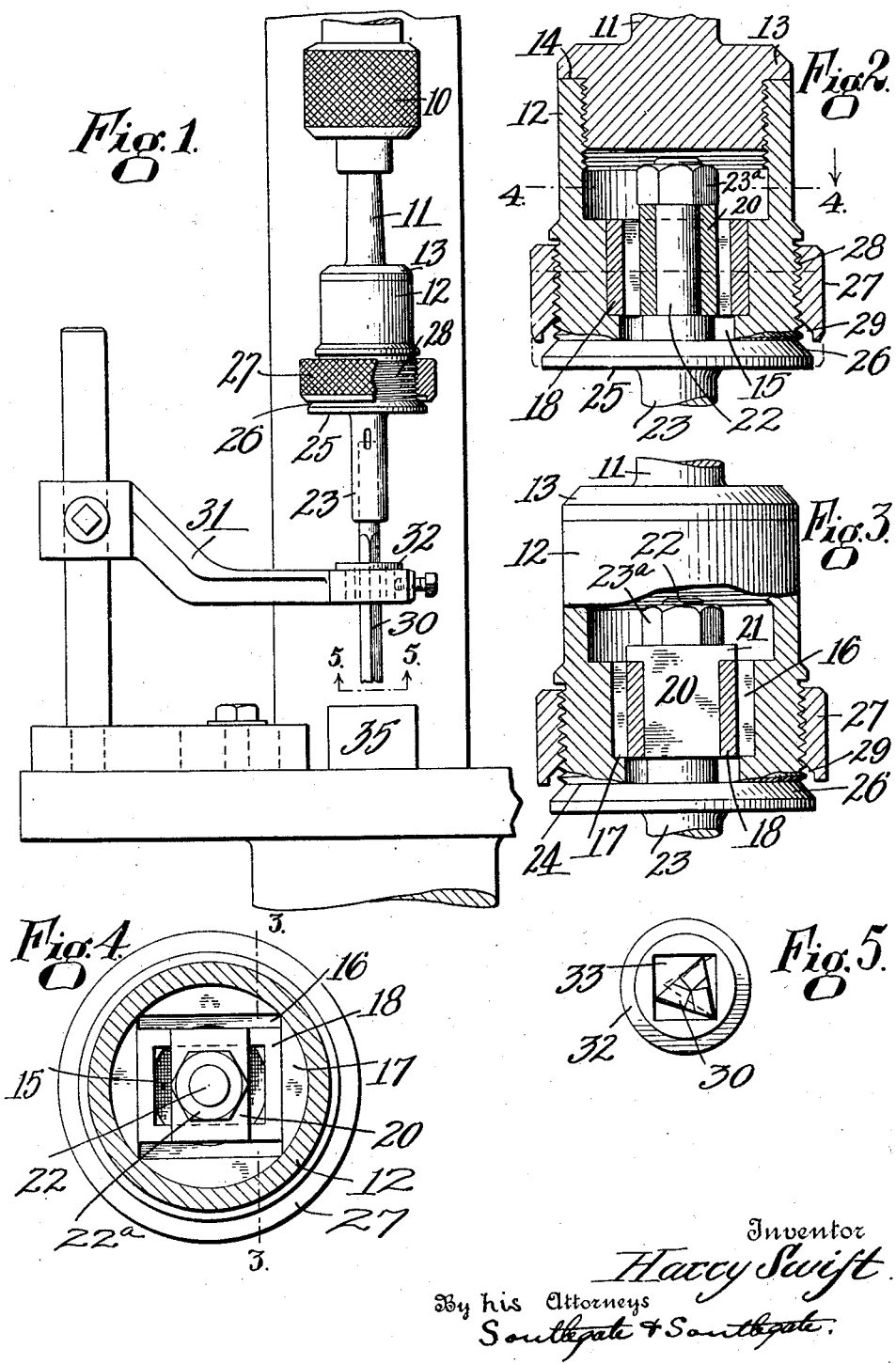
Inventor
Harry Swift
By his Attorneys
Southgate & Southgate

UNITED STATES PATENT OFFICE.

HARRY SWIFT, OF WEBSTER, MASSACHUSETTS.

DEVICE FOR DRILLING SQUARE HOLES.

1,408,042.  Specification of Letters Patent.  Patented Feb. 28, 1922.

Application filed May 19, 1920. Serial No. 382,580.

*To all whom it may concern:*

Be it known that I, HARRY SWIFT, a citizen of the United States, residing at Webster, in the county of Worcester and State of Massachusetts, have invented a new and useful Device for Drilling Square Holes, of which the following is a specification.

This invention relates to a device capable of drilling or boring square holes of the type in which a triangular drill is applied through a guide of the same shape and size as the hole to be drilled, the drill being mounted in a chuck in such a way as to be capable of lateral motion to follow the lines of the guide.

The principal objects of the invention are to provide a connection between the drill holder and the supporting chuck of such a nature as to hold the drill holder effectively with its axis always parallel to itself; to permit of the horizontal and lateral motions without a tilting action even when the parts are worn; to provide a more effective guide in the chuck for the drill holder than has been done heretofore, and to provide means of a simple and complete character for readily converting the device into an ordinary drill for boring circular holes.

Further objects and advantages of the invention will appear hereinafter.

Reference being had to the accompanying drawing, in which—

Fig. 1 is an elevation of part of a drill with a preferred embodiment of this invention applied thereto;

Fig. 2 is an enlarged central sectional view through the centre of the chuck;

Fig. 3 is a sectional view on the line 3—3 of Fig. 4;

Fig. 4 is a sectional view on the line 4—4 of Fig. 2, and

Fig. 5 is a bottom plan view of the drill and external guide.

The invention may be applied to a drill, lathe or other machine employing a rotary motion for drilling, and I have shown it as applied to an upright drill having a head 10 which in the well known way holds the shank 11 extending from a chuck 12. This shank is connected with the chuck by means of a screw threaded head 13 integral with the same and having a shoulder 14 for covering the edge wall of the chuck.

The chuck is provided at its opposite lower end with a circular passage 15 and with a square chamber 16 above this passage, the square chamber being larger both in width and length than the diameter of the passage so as to furnish a smooth flat surface 17 on which is slidably mounted a rectangular block or slide 18. The long dimension of the slide is such that it fits the square chamber and it can have only a rectilinear motion. This slide has a rectangular passage through it of substantially the same shape as the block so that the side walls are substantially uniform in thickness. Extending through the passage in this block is a similar block 20 preferably square in cross-section and fitting the smaller dimension of the rectangular block. This inner block projects over beyond the inner end of the block 18 and is provided with flanges 21 at opposite sides forming a flat surface on top and projecting over the side walls of the block 18. As the lower surface of these flanges fits against the ends of these walls this furnishes a guide to help keep the block 20 from moving out of parallel position. For that purpose they constitute an important feature of the invention.

The shank 22 of the drill holder 23 fits snugly through the passage in the block 20 and is held firmly to it by a nut 23ª inside the chuck. It will be seen therefore, that the under surfaces of the flanges 21 cooperate with the flat top of the block 18 and the bottom of the block 18 cooperates with the flat surface 17 to hold the drill holder in its proper place and prevent it from getting into an inclined position. This result is also assisted of course by the fitting of the block 20 in the interior of the block 18 and the interior of the block 18 against the opposite walls of the chamber 16. A further check is put upon the movement of the drill holder into inclined position by the provision of a flat surface at 24 on the end of the chuck and the corresponding flat surface on the contacting side of the flange 25 on the drill holder, this flange being of a diameter equal to that of the chuck.

Another feature of the invention consists in making the upper part of the flange 25 conical at 26 and the provision of a collar 27 screwed on a left hand screw thread 28 on the outside of the chuck and providing it with a conical socket 29 so that it can be moved out far enough for the two conical surfaces 26 and 29 to come into contact as shown in dotted lines in Fig. 2. This obviously centers the drill holder and prevents all shifting motion thereof, so that it can be used with an ordinary drill to bore a circular hole.

In the use of the device for drilling a square hole a triangular drill 30 is placed in the drill holder and the collar 27 raised. A fixed guide 31 is arranged in rigid position and provided with a guide piece 32 having therethrough a hole 33 of the exact size and shape as the hole to be drilled. The work 35 is placed on the end of the machine and the chuck rotated in the usual way. The drill swings around first one edge and then another and gradually bores out a square hole in the work of exactly the size and shape as the hole 33. The lower surface of the drill is made substantially flat and relieved slightly in order to allow the chips to escape.

Although I have shown a specific form of the invention and shown it as applied to a specific form of machine tool, I am aware of the fact that modifications can be made therein and that it can be applied to other tools without departing from the scope of the invention as expressed in the claims, therefore, I do not wish to be limited to all the details herein shown and described but having thus fully described my invention, what I claim and desire to secure by Letters Patent is:—

1. In a drill, the combination of a hollow drill chuck having a central passage in the end and a larger chamber at the inner end of said passage, a drill holder loosely passing through said passage into the chuck and free to move laterally in the passage, a block in the chuck to which the shank of the drill holder is fixed, a hollow block in the chuck, and means for centering the drill holder with respect to the chuck, to permit of boring round holes.

2. In a device for drilling square holes, the combination of a hollow drill chuck having a central passage in the end and a larger chamber at the inner end of said passage, a drill holder loosely passing through said passage into the chuck and free to move laterally in the passage, a block in the chuck to which the shank of the drill holder is fixed, said block having flat flanges projecting laterally from its inner end, a hollow block in the chuck, the outside dimension of the hollow block being substantially the same as the side of said chamber in which it is slidingly located, the flanges resting against the flat end of said hollow block to form a guide to keep the drill holder firmly in position, and means for centering the drill holder with respect to the chuck to permit of boring round holes.

3. In a device for drilling square holes, the combination of a hollow drill chuck having a central passage in the end and a larger chamber at the inner end of said passage, a drill holder loosely passing through said passage into the chuck and free to move laterally in the passage, a block in the chuck to which the shank of the drill holder is fixed, slidable in the block in one direction, said block having a projection, a hollow block in the chuck, slidable in the block in a direction at right angle to that in which the first named block slides, resting against the projection to form a guide to keep the drill holder from moving to an inclined position, said chuck having a left hand screw thread on the outside, and a collar on said screw thread having a surface for engaging and centering the drill holder.

4. In a drill, the combination of a hollow drill chuck having a central passage in the end and a larger chamber at the inner end of said passage, a drill holder loosely passing through said passage into the chuck and free to move laterally in the passage, a block in the chuck to which the shank of the drill holder is fixed, slidable in the block in one direction, a hollow block in the chuck, slidable in the block in a direction at right angles to that in which the first named block slides, said chuck having a left hand screw thread on the outside, and a collar on said screw thread having a surface for engaging and centering the drill holder.

In testimony whereof I have hereunto affixed my signature.

HARRY SWIFT.